June 16, 1925.  
C. H. JASPER  
1,541,963  
SAFETY DEVICE FOR NUTS ON BOLTS  
Filed Oct. 28, 1924
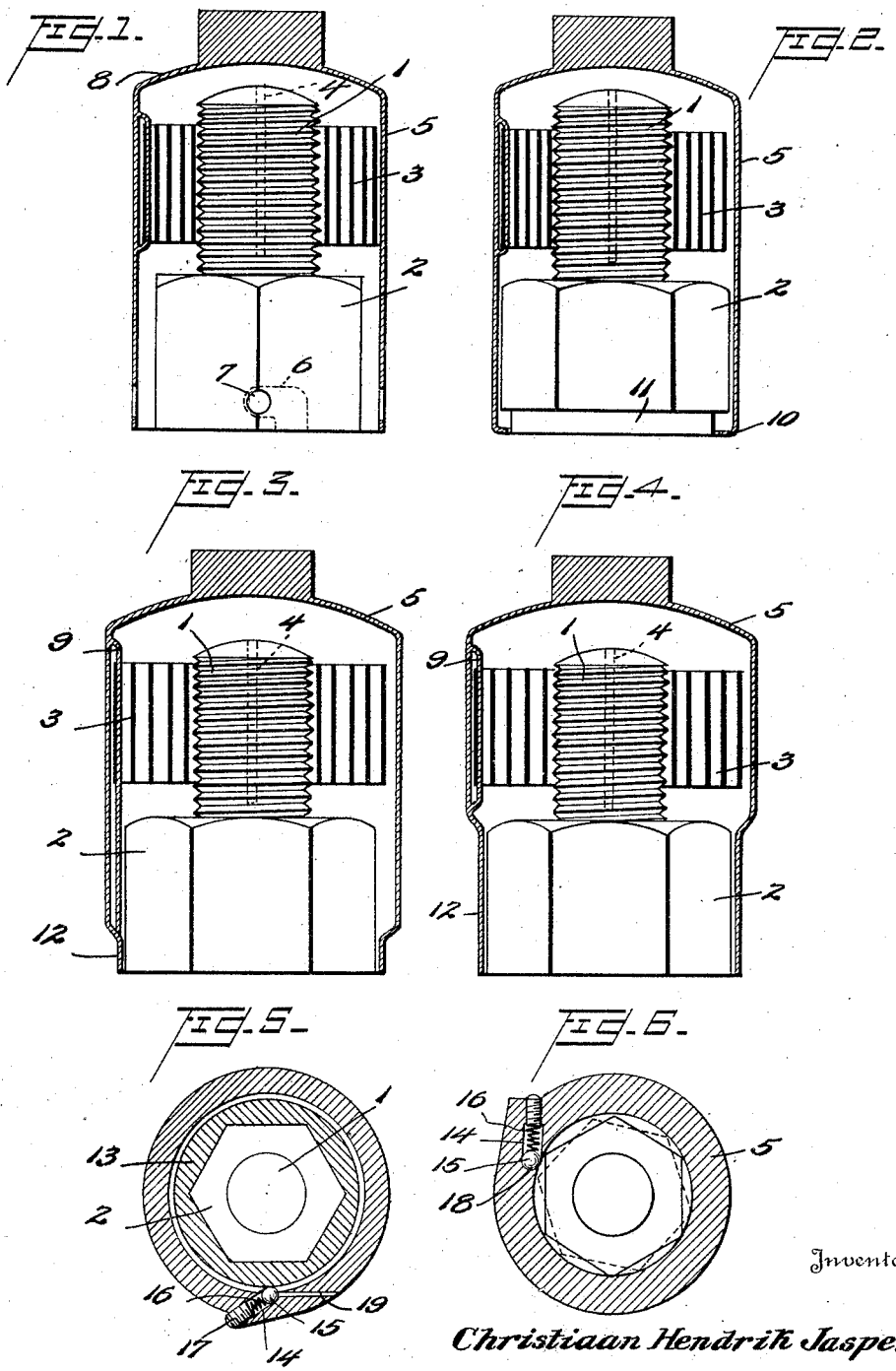

Patented June 16, 1925.

1,541,963

UNITED STATES PATENT OFFICE.

CHRISTIAAN HENDRIK JASPER, OF ROTTERDAM, NETHERLANDS.

SAFETY DEVICE FOR NUTS ON BOLTS.

Application filed October 28, 1924. Serial No. 746,304.

*To all whom it may concern:*

Be it known that I, CHRISTIAAN HENDRIK JASPER, electro-technician, subject of the Queen of the Netherlands, residing at Rotterdam, in the Province of South-Holland, in the Kingdom of the Netherlands, have invented certain new and useful Improvements in Safety Devices for Nuts on Bolts, of which the following is a specification.

This invention relates to a safety device for nuts on bolts of the type comprising a cap surrounding the nut. Such caps are used for protecting the nuts and bolts from the action of the atmosphere.

The chief object of this invention is to provide a construction by which an efficient protection against the atmosphere is obtained and by which any loosening of the nut, in consequence of vibrations or shocks, is followed by a tensioning action of a member which connects the cap and the nut, no specially shaped nut being required.

Locking devices are known in which the nut is locked by the tensioning action of an exposed spring which connects the nut to the bolt, the arrangement being such that after the nut has been tightened, any unlocking action will be prevented by the spring engaging in one of a series of grooves on the bolt. In another known form of locking device, the nut is locked to the bolt by a ball placed within a bore made into the nut, said ball being pressed against the thread on the bolt by a spring and released by putting on the wrench or spanner, the jaws of which thereby act upon another ball which normally projects slightly beyond the outer face of the nut and which actuates the locking ball to release it by means of a pin when the projecting ball is pushed inwardly.

According to the invention a cap is provided which is set to enclose the nut, and is connected with the bolt on which the nut is screwed by a spring in such a manner that the spring is tensioned by turning the cap in a direction opposite to that for tightening the nut on the bolt without incurring a locking action between cap and nut; whilst the cap locks the nut as soon as the cap is released in its locking position. For this purpose the elasticity of the spring connecting the cap with the bolt may be such that the cap may be moved so as to be free from the nut, then turned to tension the spring and finally moved to lock the nut. A locking device may be used situated between the inner wall of the cap and the outer surface of the nut in which case the spring can be tensioned when the cap is in the locking position. If it is desired to use a standardized cap for nuts of different dimensions a ring may be interposed between cap and nut.

In order that the invention may be clearly understood and readily carried out the same is described more fully with reference to the accompanying drawings, in which:

Figure 1 is a longitudinal section showing the parts assembled.

Figure 2 is a longitudinal section of another embodiment.

Figure 3 is a longitudinal section of still another embodiment.

Figure 4 is a longitudinal section of a modification of the embodiment shown in Figure 3.

Figure 5 is a transverse section of a further embidement.

Figure 6 is a transverse section of still another embodiment.

In Figure 1 the bolt is indicated by 1 and the nut, tightly fixed onto the bolt, by 2. 3 is a spring, preferably a spiral spring, the ends of which are bent in such a manner that the inner end of the spring may engage with a groove 4 in the bolt, and the outer end of the spring may be attached to the inner wall of the cap by a bridge piece 9 or in any other manner. In Figure 1 the cap forms a cylindrical casing the inner diameter of which is such that the cap can be pushed over the nut. The cover 8 of the cap may be made in one piece with the main portion 5 or may be made separate therefrom, being attached thereto in any convenient manner such that the cover may be removed for inspecting the device. At its lower end the cap is provided with bayonet grooves 6 which in the locking position of the cap engage with pins 7 on the outer periphery of the nut. In using the apparatus the cap is pushed over the nut in such a manner that the lower end of the cap does not touch the pins 7 on the nut. Then the cap with the spring secured inside is turned in a counter-clockwise direction during which the inner end of the spring engages with the groove 4 in the bolt, so that the spring is tensioned. Thereupon the cap and the nut are locked together by the bayonet joint formed by the grooves 6 and pins 7. If on moving the cap over the nut the spring should happen to be forced out of its place the spring will re-adjust itself when in use by the shocks and vibrations to which the device is subjected. As appears from the drawing the cap in this case does not only surround and enclose the nut, but also tends to tighten the nut further so that any loosening action of the nut due to vibrations or shocks is met by the tightening moment exercised by the spring.

In Figure 2 an embodiment is shown in which the cap at its open lower end is provided with an inwardly projecting flanged edge 10 corresponding to the shape of the nut 2, said nut having a circular lower portion 11 the diameter of which is such that the hexagonal edge of the cap may be rotated thereon. If therefore the cap is pushed over the nut in such a manner, that the hexagonal inner edge engages with the nut, the latter prevents the cap from rotating relative to the nut. To lock the nut the cap is first placed thereon in the aforedescribed manner, the inner end of the spring engaging again with the groove in the stud upon a slight rotation of the cap on the nut. Then the cap is shifted further over the nut so, that its inner edge 10 passes on to the circular portion 11 of the nut as shown in Fig. 2, so that the cap may be rotated. This rotation is again effected in a counter-clockwise direction in order to tension the spring and thereafter the cap is shifted back upon the nut until the hexagonal edge of the cap surrounds the main portion of the nut.

In the embodiment shown in Figure 3 the cap is provided on its inner wall with a bridge 9 which is slidably engaged by one end of the spring and extends nearly to the lower end of the cap, said lower end 12 being formed to correspond in size and shape to the outer periphery of the nut. The spring is thus capable of sliding along the inner wall lengthwise of the cap. In using this device the spring is moved to the lower end of the cap, so that the cap can be easily put on the nut the inner end of the spring directly engaging the groove 4 of the bolt. For tensioning the spring the cap is again turned in a counter-clockwise direction after said cap has been moved so as to be free of the nut. After the spring has been tensioned the cap is pushed over the nut, during which movement the spring slides back into its right position behind the bridge piece 9.

In the last described embodiment, preferably a spring is used the windings of which lie against each other so that the spring when its windings are not in one and the same plane has no tendency of its own to move back into its right position during the rotation of the cap for tensioning the spring.

Figure 4 shows a modification of the device illustrated in Figure 3. According to this modification the bridge piece 9 only extends to about midway the height of the cap so that the spring 3 cannot appreciably slide in axial direction. The diameter of the spring when in untensioned condition is larger than the inner diameter of the part of the cap in which it normally comes to lie. This has the effect that when the spring is adjusted in its place within the cap the inner end of the spring which has to enter the groove of the bolt 1, can be gripped and drawn axially until it is substantially flush with the open end of the cap. It will remain in this position when released owing to the initial tension of the spring within the cap. The inner end of the spring can now be readily introduced into the groove of the bolt without the lower end 12 of the cap, the height of which is substantially equal to that of the nut 2, still engaging the nut. The cap is now turned in counter-clockwise-direction as described, resulting in the tensioning of the spring, the inner end of which will thereby tend to be drawn upwards away from the nut. The inner end of the spring is however held by its own grip on the bolt, so that the spring tends to draw the cap downwards over the nut. When the spring has been sufficiently tensioned, the cap is released and takes up the position shown in Figure 4, in which the nut is locked, the lower end 12 being formed as in the previous example to correspond in size and shape to the outer periphery of the nut.

Figure 5 illustrates an embodiment in which a special locking device is used for locking the cap to the nut. In this embodiment a ring 13 is interposed between the nut and the inner wall of the cap. Said ring has such dimensions that its inner wall corresponds to the outer periphery of the nut 2 whereas its outer wall corresponds to the inner cylindrical wall of the cap 5. The wall of the cap is provided with a hole 14, the axis of which forms an angle with the radius of the cap and containing a ball 15. This ball is pressed inwardly by a little spring 16 which is provided between the ball and a grub screw 17 or the like. As will be seen from the drawing the direction of the bore 14 in the wall of the cap is such that any tendency of the cap to turn back under the influence of the tensioned nut retaining spring (not shown) causes the ball 15 to be clamped in the corner formed by the end of the hole and the circumference of the ring 13, so that if the tightened nut has a tendency to become loosened by vibrations or shocks the cap immediately turns backwards so far that the nut becomes tightened again. In order to dismantle the device it is only necessary to release the ball from its grip in the corner and for this purpose the wall of the cap is provided with another little hole 19 opening into the corner. It is therefore only necessary to put a nail or the like into the hole to push the ball away from the corner.

Figure 6 shows an embodiment without a ring. In this embodiment the hole 14 is bored approximately tangentially and arranged at 18 to open radially through the inner wall of the cap. The ball 15 is prevented from falling out by suitably shaping the edges of the hole opening into the inner wall of the cap. In turning the cap 5 in a counter-clockwise direction for tensioning the nut retaining spring (not shown), the ball each time it engages with a flat side of the nut, is pushed inwardly into the hole by said side. When the spring has been tensioned and the cap is released the cap will turn back until the ball gets clamped in the curve of the hole by the side of the nut which at this moment engages with the ball as indicated in full lines. A spring 16 holds the ball against the nut.

Instead of a ball a roller may be used, the length of which corresponds to the height of the nut and which is put into a groove the length of which is equal to that of the roller and the direction of which corresponds to that of the hole in Fig. 5. It is also possible to arrange that a pin may be pushed tangentially through the wall of the cap so that it comes to lie between the nut and the inner wall of the cap after the spring has been tensioned by turning the cap. In this case the spring is released by pulling out the pin. Further the locking device may consist of a pawl in the wall of the cap which is forced by a spring into teeth on the outer periphery of the ring surrounding the nut, said teeth being shaped in such a manner that the pawl permits the cap to be turned in a counter-clockwise direction but engages with the teeth upon rotation of the cap in a clockwise direction.

What I claim is:

1. A locking safety device for a bolt nut, comprising an axially applicable cap adapted to enclose a nut and having a nut-engaging end portion and an inner portion larger than the bolt, a coiled spring within said cap, the outer end of said coiled spring being attached to said cap, said bolt having a radial longitudinal groove therein extending partially therethrough at the part thereof projecting beyond said nut; the inner end of said coiled spring being adapted to automatically enter into said groove in said bolt on turning the cap counter-clockwise and to be retained thereby, whereby said cap tends to keep the nut tight, the diameter of the inner portion of the cap being less than the diameter of the untensioned spring.

2. A locking safety device for a bolt nut, comprising an axially applicable cap adapted to enclose the nut and the end of the bolt projecting therebeyond and protect the same against atmospheric influences, said cap having a nut engaging end portion and having a web formed on the inner longitudinal surface thereof to provide a slot between said wall and said web, a coiled spring within said cap, the outer end of said coiled spring being engaged in said slot, said bolt having a radial longitudinal groove therein at the part thereof projecting beyond said nut; the inner end of said coiled spring being adapted to automatically enter into said groove in said bolt on turning the cap counter-clockwise and to be retained thereby, whereby said cap tends to keep the nut tight.

3. A locking device, as claimed in claim 2 in which the diameter of the inner portion is less than the diameter of the untensioned spring.

In testimony whereof I have hereunto set my hand.

CHRISTIAAN HENDRIK JASPER.